US011974959B1

(12) United States Patent
Chen

(10) Patent No.: US 11,974,959 B1
(45) Date of Patent: May 7, 2024

(54) RETRACTABLE WALKER

(71) Applicant: Yu Chen, Yibin Sichuan (CN)

(72) Inventor: Yu Chen, Yibin Sichuan (CN)

( * ) Notice: Subject to any disclaimer, the term of this patent is extended or adjusted under 35 U.S.C. 154(b) by 0 days.

(21) Appl. No.: 18/411,186

(22) Filed: Jan. 12, 2024

(51) Int. Cl.
*A61H 3/04* (2006.01)
*A61H 3/00* (2006.01)

(52) U.S. Cl.
CPC ......... *A61H 3/04* (2013.01); *A61H 2003/006* (2013.01); *A61H 2201/0192* (2013.01); *A61H 2201/1633* (2013.01); *A61H 2201/1635* (2013.01)

(58) Field of Classification Search
CPC .... A61H 2201/1633; A61H 2201/0192; A61H 2201/006; A61H 3/04
See application file for complete search history.

(56) References Cited

U.S. PATENT DOCUMENTS 5,306,035 A * 4/1994 Counts ................. A61G 5/0825 280/270
5,353,824 A * 10/1994 Woods ..................... A61H 3/00 297/44
9,808,394 B1 * 11/2017 Jiang ........................ A61H 3/04
10,391,018 B1 * 8/2019 Fitzwater ................. A61H 1/00
10,470,963 B1 * 11/2019 Donahoe ............... F16B 7/0426
10,857,058 B1 * 12/2020 Casibang ................. A61H 3/04
11,648,170 B1 * 5/2023 Abrahamson ............. F16C 1/18 280/47.34
11,779,506 B1 * 10/2023 Liu .......................... A61H 3/04 135/67
2005/0211285 A1 * 9/2005 Cowie .................. A61G 5/0883 135/74
2007/0199586 A1 * 8/2007 Cheng ...................... A61H 3/04 280/87.021
2009/0194974 A1 * 8/2009 Smith ...................... A61G 5/02 280/647
2012/0223509 A1 * 9/2012 Gaudiano ................ A61H 3/04 280/647
2015/0202100 A1 * 7/2015 Andersen ................. A61H 3/00 29/428
2015/0342822 A1 * 12/2015 Osterhaus ................ A61H 3/04 280/657
2017/0008544 A1 * 1/2017 Kindberg ................ B62B 7/042
2017/0119616 A1 * 5/2017 Wang ....................... A61H 3/04
2017/0296407 A1 * 10/2017 Kuschall .............. A61G 5/0816
2020/0078257 A1 * 3/2020 Miller ...................... A61H 3/04
2023/0028131 A1 * 1/2023 Hooworth ................ A61H 3/04

* cited by examiner

*Primary Examiner* — Erez Gurari

(57) ABSTRACT

A retractable walker is disclosed, including left armrest component, a right armrest component, a seat, two front support members, and two rear support members. The left armrest component and the right armrest component are configured to be disposed at left and right and connected to each other in a left and right retractable adjustment. The seat includes a horizontal support frame and a seat plate, the horizontal support frame has a left and right retractable structure, and left and right ends of the horizontal support frame are configured to be mounted to the left armrest component and the right armrest component for connection respectively. The retractable walker can be retracted to adjust sizes, thereby applicable to different tall and short, fat and thin populations, which can greatly improve versatility of this product, more convenient to use.

20 Claims, 6 Drawing Sheets

RETRACTABLE WALKER

TECHNICAL FIELD

The present application relates to the technical field of walkers, and in particular to a retractable walker.

BACKGROUND

A walker is an auxiliary tool that helps people with walking difficulties by providing stabilizing support and balance, thereby reducing stress and fatigue when walking. A principle of the walker is to assist a person with walking difficulties by providing stabilizing support and balance control. Specifically, the walker usually consists of a lightweight aluminum or steel structure that is equipped with four support points at its bottom to keep the walker stable. On both sides of the walker, there are also handles which a user may control movement and direction of the walker. The principle of the walker also includes provision of assistive devices such as wheelchair cushions, armpit canes, etc. to provide better support and balance control. In addition, some walkers are also equipped with safety devices such as no-slip pads and brakes to ensure safety of users when walking. Applicable people of the walker, for example, the elderly, the disabled, people with mobility problems, etc. Scopes applicable to the walker may include walking indoors and outdoors, shopping, traveling, outdoor activities and other occasions. Different walkers may applicable to various scopes.

However, a size of the walker at present is fixed, and it is not possible to adjust the size by expansion, thus it cannot be adapted to different tall and short, fat and thin populations, versatility is relatively low and also it is not convenient to use. Therefore, it is necessary to improve existing walkers.

SUMMARY

In view of shortcomings of existing technologies, the present disclosure aims to provide a novelty retractable walker, which can effectively solve problems of inconvenience use caused by inability to retract to adjust sizes of the existing walkers.

To achieve above objectives, the present disclosure adopts following technical solutions.

In some embodiments of the present disclosure, a retractable walker is provided, which includes a left armrest component, a right armrest component, a seat, two front support members, and two rear support members. Herein the left armrest component and the right armrest component are configured to be disposed at left and right and connected to each other in a left and right retractable adjustment. The seat includes a horizontal support frame and a seat plate, the horizontal support frame has a left and right retractable structure, and left and right ends of the horizontal support frame are configured to be mounted to the left armrest component and the right armrest component for connection respectively, and the seat plate is disposed on the horizontal support frame. The two front support members have upper and lower retractable structures and the two front support members are configured to be mounted to a front bottom of the left armrest component and a front bottom of the right armrest component for connection respectively. The two rear support members also have the upper and lower retractable structures, and the two rear support members are configured to be mounted to a rear bottom of the left armrest component and a rear bottom of the right armrest component for connection respectively.

In some preferred embodiments of the present disclosure, the left armrest component includes a left side frame and a left front frame, and the left front frame is configured to be connected to a front side of the left side frame. The right armrest component includes a right side frame and a right front frame, the right front frame is configured to be connected to a front side of the right side frame, and the right front frame and the left front frame are configured to be sleeved to each other in a left and right retractable connection.

In some preferred embodiments of the present disclosure, the left side frame includes a left R rod, a left upper reinforcing rod and a left lower reinforcing rod. Both ends of the left upper reinforcing rod are configured to be fixedly connected to front and rear sides of an upper end of the left R rod respectively and both ends of the left lower reinforcing rod are configured to be fixedly connected to front and rear sides of a lower end of the left R rod respectively. The right side frame includes a right R rod, a right upper reinforcing rod and a right lower reinforcing rod. Both ends of the right upper reinforcing rod are configured to be fixedly connected to front and rear sides of an upper end of the right R rod respectively and both ends of the right reinforcing rod are configured to be fixedly connected to front and rear sides of a lower end of the right R rod respectively.

In some preferred embodiments of the present disclosure, the left R rod is sleeved with a left upper armrest cover and the right R rod is sleeved with a right upper armrest cover accordingly.

In some preferred embodiments of the present disclosure, the right R rod is sleeved with a left lower armrest cover and the right R rod is sleeved with a right lower armrest cover accordingly.

In some preferred embodiments of the present disclosure, the left front frame includes a left casing, a left upper rod and a left lower rod. The left casing is configured to be sleeved on a front side of the left R rod, the left upper rod and the left lower rod are configured to be disposed in parallel above and below and fixedly connected to the left casing. The right front frame includes a right casing, a right upper rod and a right lower rod. The right casing is configured to be sleeved on a front side of the right R rod, the right upper rod and the right lower rod are configured to be disposed in parallel above and below and fixedly connected to the right casing, the right upper rod and the right lower rod are configured to be sleeved with the left upper rod and the left lower rod for connection respectively.

In some preferred embodiments of the present disclosure, the left upper rod is configured to be sleeved at outside of the right upper rod and the left lower rod is configured to be sleeved at outside of the right lower rod. The left upper rod is opened with a plurality of first holes spaced in a left and right arrangement, a tail end of the right upper rod is configured with a first resilient lug, and the first resilient lug is configured to be snapped with corresponding first hole for positioning.

In some preferred embodiments of the present disclosure, a tail end of the left upper rod is sleeved with a collar and the collar is configured with a locking screw.

In some preferred embodiments of the present disclosure, the left R rod is configured to be turned left and right with respect to the left casing and a left locking mechanism is provided between the left R rod and the left front frame. The right R rod is configured to be turned left and right with respect to the right casing and a right locking mechanism is provided between the right R rod and the right front frame.

In some preferred embodiments of the present disclosure, the left front frame is opened with a left first locking hole and the left R rod is opened with a left second locking hole. The left locking mechanism includes a left handle and a left locking pin, the left handle is configured to be hingedly connected to the left R rod and swung up and down with respect to the left R rod, the left locking pin is disposed on the left handle to move with the left handle, and the left locking pin is configured to be fitted with the left first locking hole and the left second locking hole for insertion. The right front frame is opened with a right first locking hole and the right R rod is opened with a right second locking hole. The right locking mechanism includes a right handle and a right locking pin, the right handle is configured to be hingedly connected to the right R rod and swung up and down with respect to the right R rod, the right locking pin is disposed on the right handle to move with the right handle, and the right locking pin is configured to be fitted with the right first locking hole and the right second locking hole for insertion.

In some preferred embodiments of the present disclosure, left and right ends of the horizontal support frame are configured to be detachably mounted on the left lower reinforcing rod and right lower reinforcing rod respectively.

In some preferred embodiments of the present disclosure, the horizontal support frame is configured to be moved adjustable back and forth along the left lower reinforcing rod and the right lower reinforcing rod.

In some preferred embodiments of the present disclosure, both ends of the horizontal support frame are disposed on a first fastener end cap and a second fastener end cap respectively, the first fastener end cap and the second fastener end cap are mounted on the left lower reinforcing rod and the right lower reinforcing rod respectively.

In some preferred embodiments of the present disclosure, the horizontal support frame includes two left support tubes and two right support tubes. The two left support tubes are configured to be arranged at parallel intervals front to back, and the two right support tubes are configured to be arranged at parallel intervals front to back and sleeved with the two left support tubes respectively. The two right support tubes are configured to be moved from left to right with respect to the two left support tubes, and locking members are provided between the two right support tubes and the two left support tubes.

In some preferred embodiments of the present disclosure, bottom of the seat plate is configured to be connected to the horizontal support frame via a plurality of U-shaped connectors.

In some preferred embodiments of the present disclosure, a plurality of air vents are formed throughout upper and lower surfaces of the seat plate.

In some preferred embodiments of the present disclosure, each of the two front support members includes a front upper support tube and a front lower support tube. An upper end of the front upper support tube is configured to be fixedly connected to the front bottom of the left R rod or the front bottom of the right R rod, and a lower end of the front upper support tube is configured with a second resilient lug. The front lower support tube is configured to be sleeved at outside of the front upper support tube and retractable disposed with respect to the front upper support tube. The front upper support tube is opened with a plurality of second holes spaced apart up and down arrangement, and the second resilient lug is configured to be fitted with corresponding second hole for positioning.

In some preferred embodiments of the present disclosure, a lower end of the front lower support tube is configured with a caster.

In some preferred embodiments of the present disclosure, each of the two rear support members includes a rear upper support tube and a rear lower support tube. An upper end of the rear upper support tube is configured to be fixedly connected to the rear bottom of the left R rod or the rear bottom of the right R rod, and a lower end of the rear upper support tube is configured with a third resilient lug. The rear lower support tube is configured to be sleeved at outside of the rear upper support tube and retractable disposed with respect to the rear upper support tube, the rear upper support tube is opened with a plurality of third holes spaced apart up and down arrangement, and the third resilient lug is configured to be fitted with corresponding third hole for positioning.

In some preferred embodiments of the present disclosure, a lower end of the rear lower support tube is configured with an anti-slip floor pad.

Compared with the existing technologies, the present disclosure has obvious advantages and beneficial effects, specifically, as can be seen from the above technical solutions, by providing the left armrest component and the right armrest component at left and right and making them connected to each other with the left and right retractable adjustment, the horizontal support frame adopts the left and right retractable structure, and cooperation with the two front support members and the two rear support members having the upper and lower retractable structures, the retractable walker of the present disclosure can be retracted to adjust sizes, thereby applicable to different tall and short, fat and thin populations, which can greatly improve versatility of this product, more convenient to use.

Figure 1:
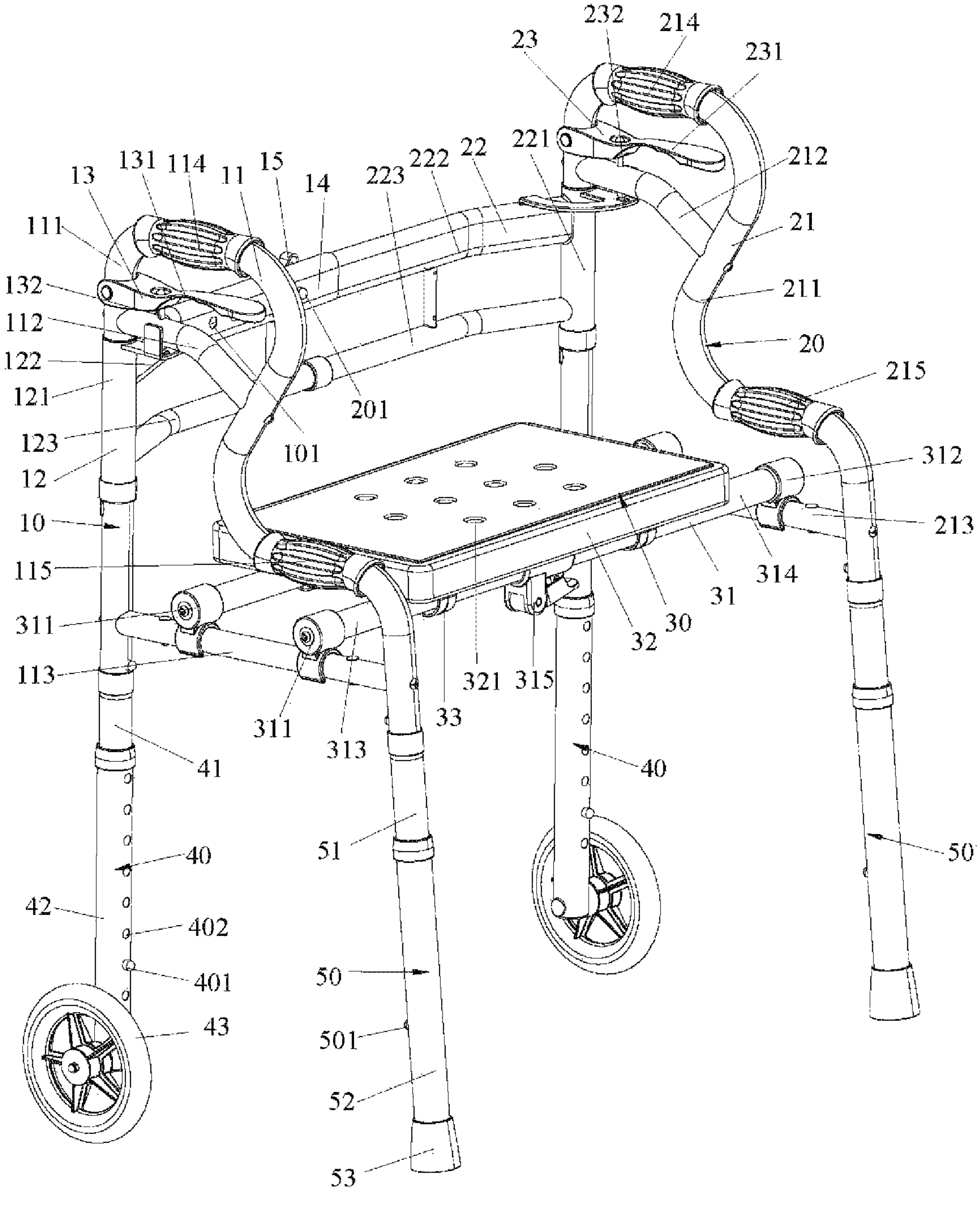
FIG. 1 shows an assembled three-dimensional schematic diagram of a retractable walker in accordance with some preferred embodiments of the present disclosure.

In the drawings, reference signs are as follows.

| | | | |
|---|---|---|---|
| 10 | left armrest component | | |
| 11 | left side frame | 111 | left R rod |
| 112 | left upper reinforcing rod | 113 | left lower reinforcing rod |
| 114 | left upper armrest cover | 115 | left lower armrest cover |

-continued

| In the drawings, reference signs are as follows. | | | |
|---|---|---|---|
| 12 | left front frame | 121 | left casing |
| 122 | left upper rod | 123 | left lower rod |
| 13 | left locking mechanism | 131 | left handle |
| 132 | left locking pin | 14 | collar |
| 15 | locking screw | 101 | first holes |
| 102 | left first locking hole | 103 | left second locking hole |
| 20 | right armrest component | | |
| 21 | right side frame | 211 | right R rod |
| 212 | right upper reinforcing rod | 213 | right lower reinforcing rod |
| 214 | right upper armrest cover | 215 | right lower armrest cover |
| 22 | right front frame | 221 | right casing |
| 222 | right upper rod | 223 | right lower rod |
| 201 | right first resilient lug | 202 | right first locking hole |
| 30 | seat | | |
| 31 | horizontal support frame | 311 | first fastener end cap |
| 312 | second fastener end cap | 313 | left support tube |
| 314 | right support tube | 315 | locking member |
| 32 | seat plate | 321 | air vent |
| 33 | U-shaped connector | 40 | front support member |
| 41 | front upper support tube | 42 | front lower support tube |
| 43 | caster | 401 | second resilient lug |
| 402 | second hole | 50 | rear support member |
| 51 | rear upper support tube | 52 | rear lower support tube |
| 53 | anti-slip floor pad | 501 | third resilient lug |
| 502 | third hole | | |

DETAILED DESCRIPTION OF THE EMBODIMENTS

Figure 2:
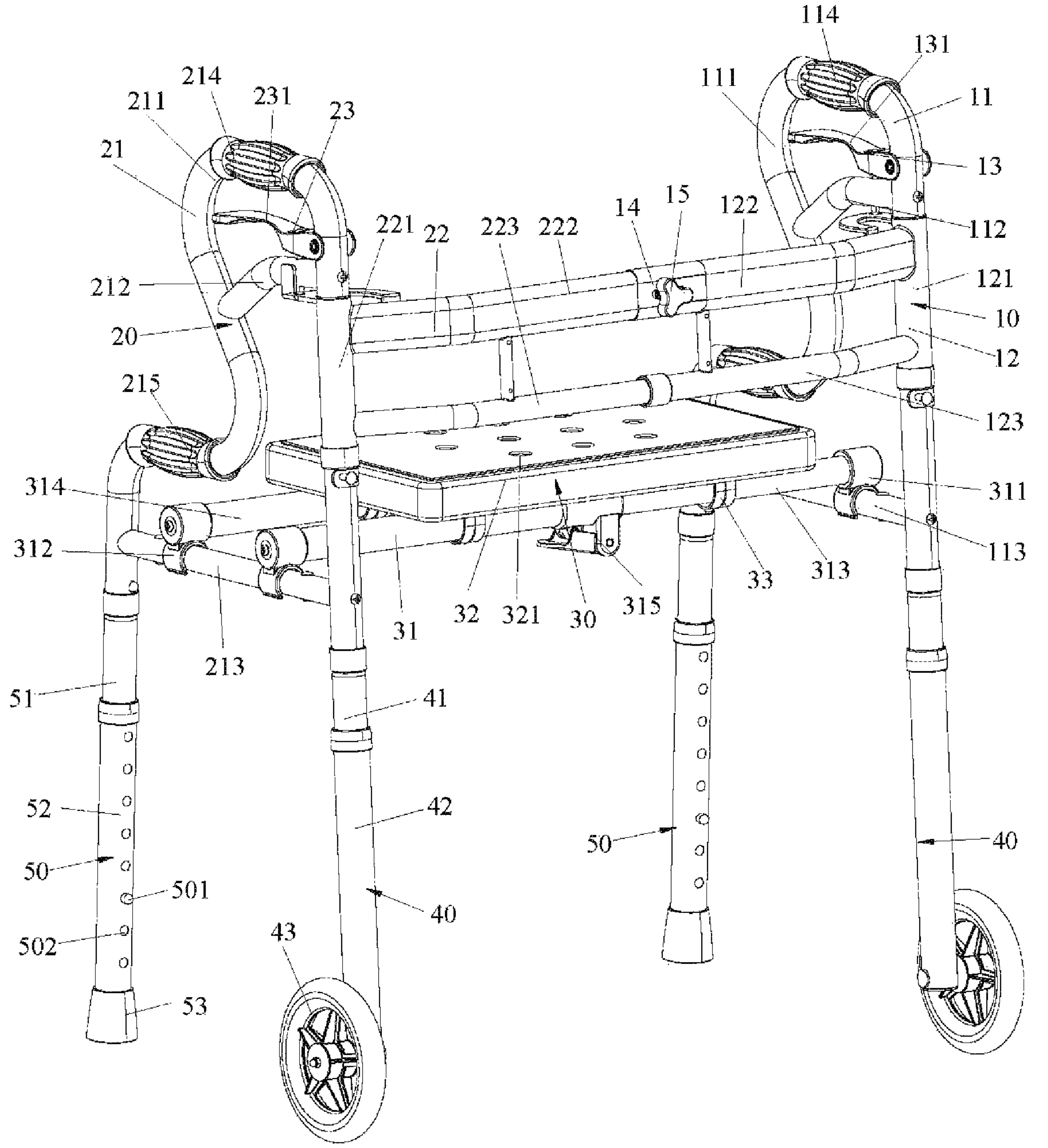
FIG. 2 shows an assembled three-dimensional schematic diagram from another angle of the retractable walker in accordance with some preferred embodiments of the present disclosure.
Figure 3:
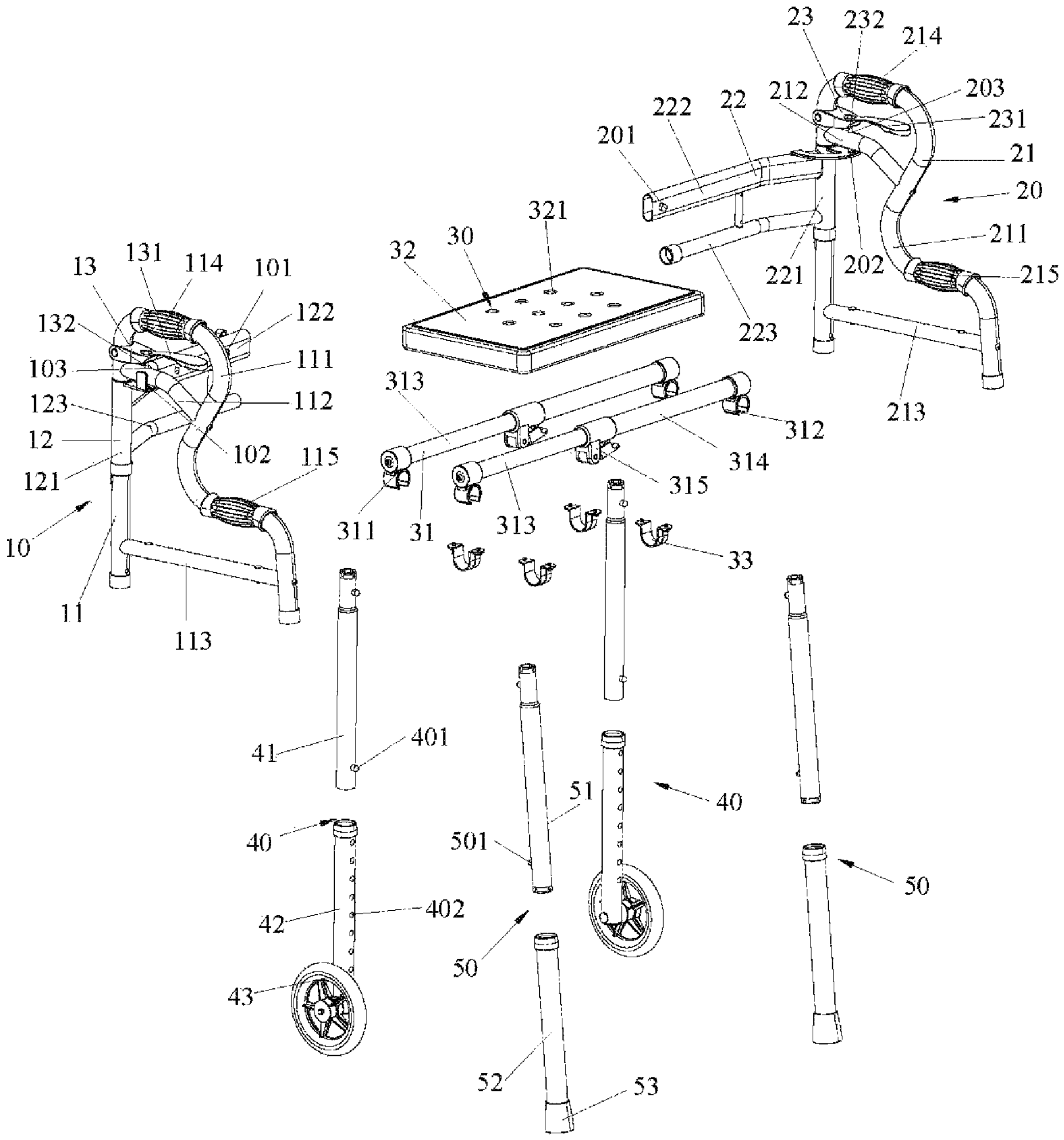
FIG. 3 shows an exploded view of the retractable walker in accordance with some preferred embodiments of the present disclosure.
Figure 4:
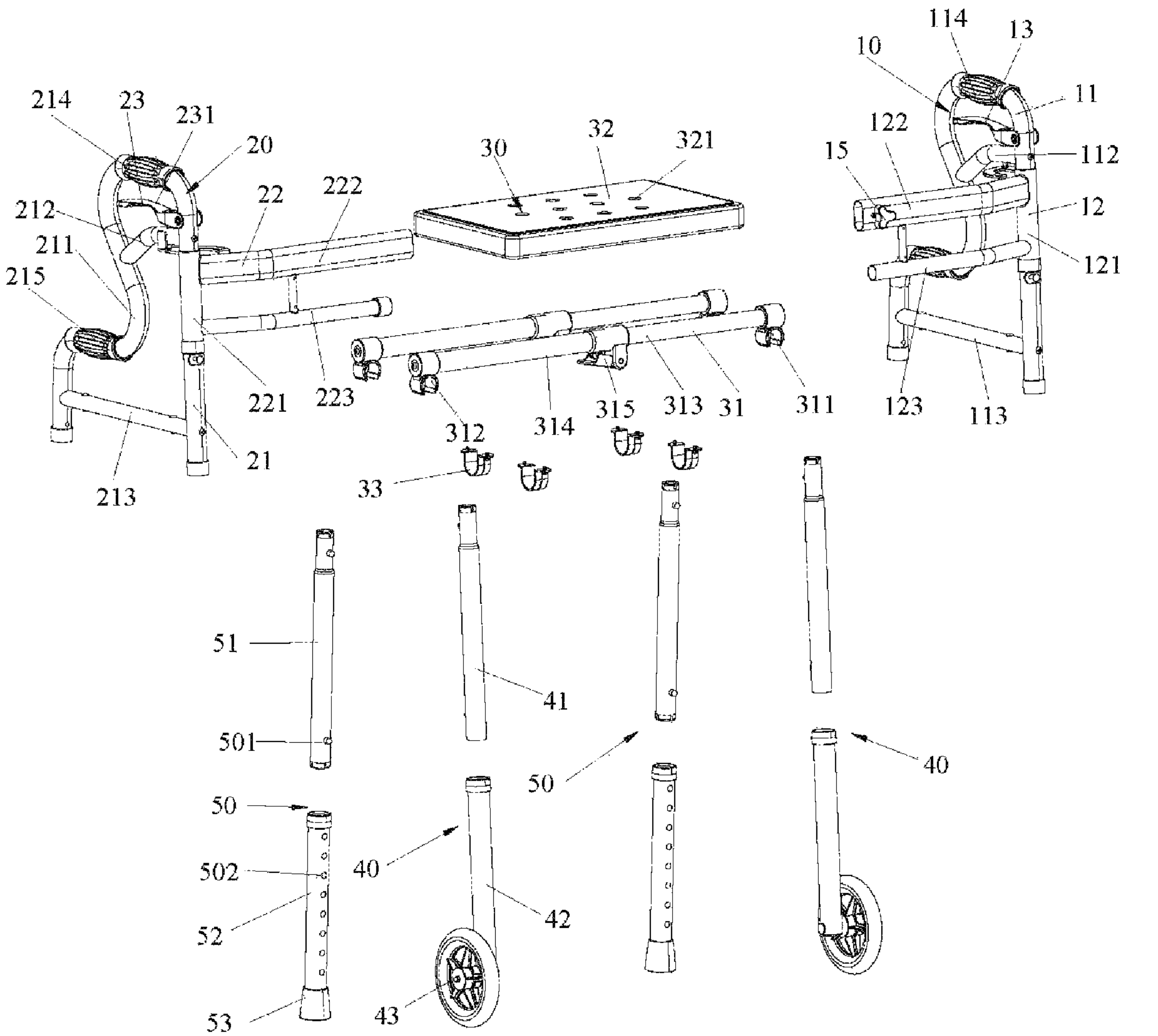
FIG. 4 shows an exploded view from another angle of the retractable walker in accordance with some preferred embodiments of the present disclosure.
Figure 5:
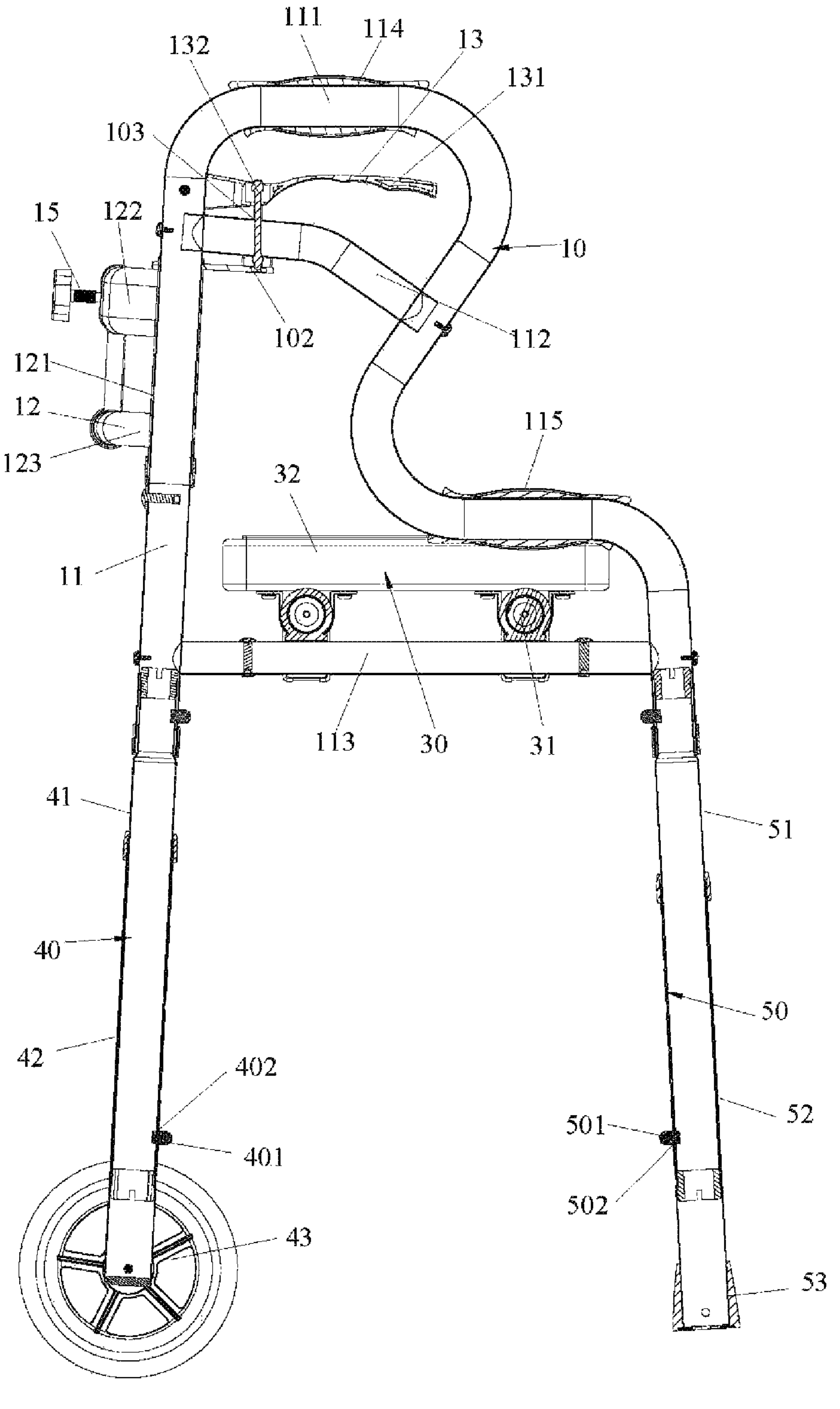
FIG. 5 shows a sectional view of the retractable walker in accordance with some preferred embodiments of the present disclosure.
Figure 6:
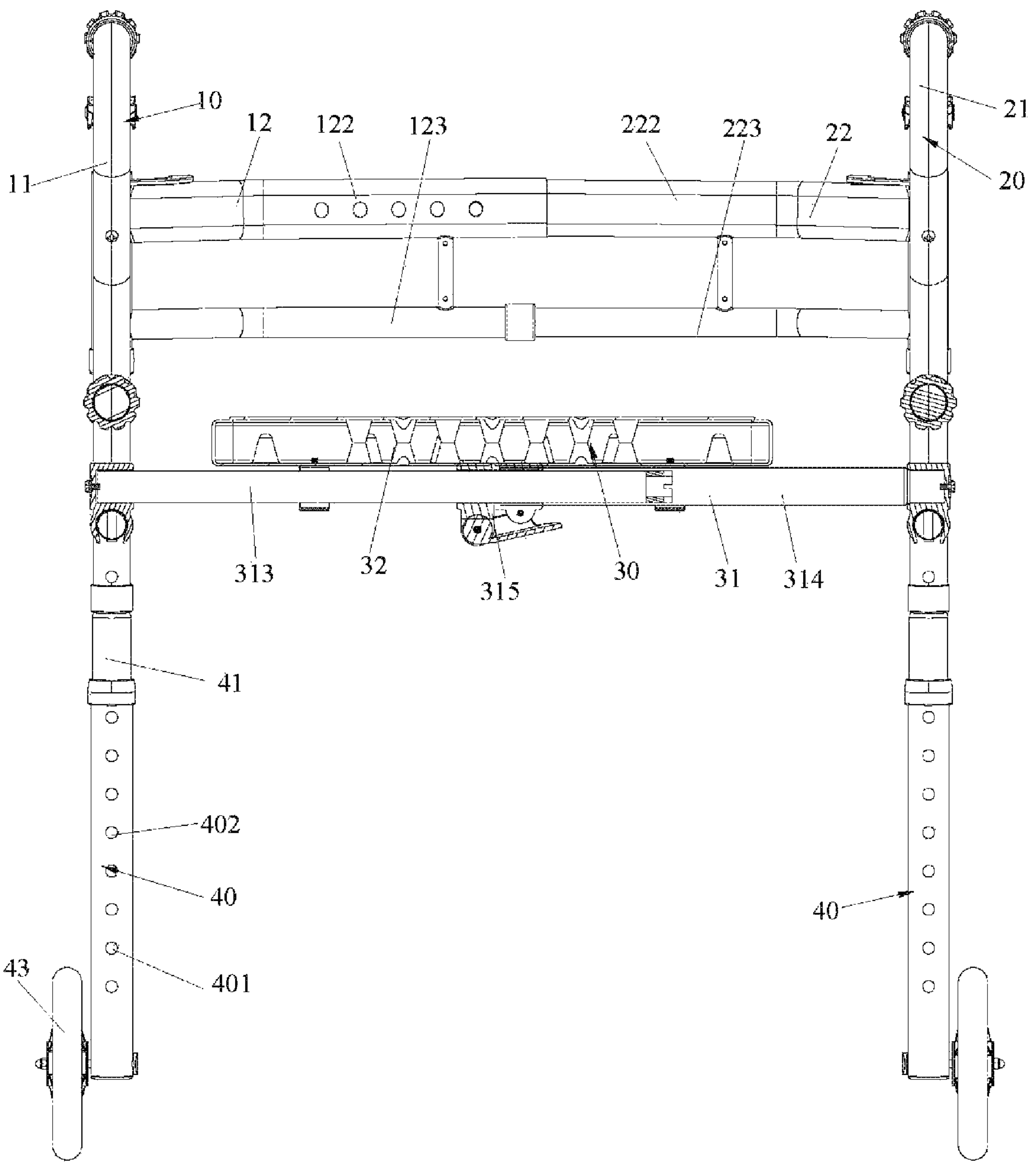
FIG. 6 shows a sectional view from another angle of the retractable walker in accordance with some preferred embodiments of the present disclosure.

Referring to FIG. 1 to FIG. 6, in some preferred embodiments of the present disclosure, a retractable walker is provided, which includes a left armrest component 10, a right armrest component 20, a seat 30, two front support members 40, and two rear support members 50.

Herein the left armrest component 10 and the right armrest component 20 are configured to be disposed at left and right and connected to each other in a left and right retractable adjustment.

Specifically, in some embodiments of the present disclosure, the left armrest component 10 includes a left side frame 11 and a left front frame 12, and the left front frame 11 is configured to be connected to a front side of the left side frame 12. The left side frame 11 includes a left R rod 111, a left upper reinforcing rod 112 and a left lower reinforcing rod 113. Both ends of the left upper reinforcing rod 112 are configured to be fixedly connected to front and rear sides of an upper end of the left R rod 111 respectively, and both ends of the left lower reinforcing rod 113 are configured to be fixedly connected to front and rear sides of a lower end of the left R rod 111 respectively. In addition, a left upper armrest cover 114 is sleeved on the left R rod 111, and a left lower armrest cover 115 is also sleeved on the left R rod 111, to increase hands comfort. The left front frame 12 includes a left casing 121, a left upper rod 122 and a left lower rod 123. The left casing 121 is configured to be sleeved on a front side of the left R rod 111, the left upper rod 122 and the left lower rod 123 are configured to be disposed in parallel above and below and fixedly connected to the left casing 121.

In some embodiments of the present disclosure, the right armrest component 20 includes a right side frame 21 and a right front frame 22. The right front frame 22 is configured to be connected to a front side of the right side frame 21, and the right front frame 22 and the left front frame 12 are configured to be sleeved to each other in a left and right retractable connection. The right side frame 21 includes a right R rod 211, a right upper reinforcing rod 212 and a right lower reinforcing rod 213. Both ends of the right upper reinforcing rod 212 are configured to be fixedly connected to front and rear sides of an upper end of the right R rod 211 respectively, and both ends of the right reinforcing rod 213 are configured to be fixedly connected to front and rear sides of a lower end of the right R rod 211 respectively. In addition, a right upper armrest cover 214 is sleeved on the right R rod 211, and a right lower armrest cover 215 is also sleeved on the right R rod 211, to increase hands comfort. The right front frame 22 includes a right casing 221, a right upper rod 222 and a right lower rod 223. The right casing 221 is configured to be sleeved on a front side of the right R rod 211, the right upper rod 222 and the right lower rod 223 are configured to be disposed in parallel above and below and fixedly connected to the right casing 221. The right upper rod 222 and the right lower rod 223 are configured to be sleeved with the left upper rod 122 and the left lower rod 123 for connection respectively. In some embodiments of the present disclosure, the left upper rod 122 is configured to be sleeved at outside of the right upper rod 222, and the left lower rod 123 is configured to be sleeved at outside of the right lower rod 223. The left upper rod 122 is opened with a plurality of first holes 101 spaced in a left and right arrangement, a tail end of the right upper rod 222 is configured with a first resilient lug 201, and the first resilient lug 201 is configured to be snapped with corresponding first hole 101 for positioning, so as to adjust the position. Moreover, a tail end of the left upper rod 122 is sleeved with a collar 14 and the collar 14 is configured with a locking screw 15, so as to lock a position between the left upper rod 122 and the right upper rod 222, thereby making the structure solid and reliable.

In some embodiments of the present disclosure, the left R rod 111 is configured to be turned left and right with respect to the left casing 121, and a left locking mechanism 13 is provided between the left R rod 111 and the left front frame 12. The right R rod 211 is configured to be turned left and right with respect to the right casing 221, and a right locking mechanism 23 is provided between the right R rod 211 and the right front frame 22. Specifically, the left front frame 12 is opened with a left first locking hole 102 and the left R rod 111 is opened with a left second locking hole 103. The left locking mechanism 13 includes a left handle 131 and a left locking pin 132, the left handle 131 is configured to be hingedly connected to the left R rod 111 and swung up and down with respect to the left R rod 111, the left locking pin 132 is disposed on the left handle 131 to move with the left handle 131, and the left locking pin 132 is configured to be fitted with the left first locking hole 102 and the left second locking hole 103 for insertion. The right front frame 22 is opened with a right first locking hole 202 and the right R rod 211 is opened with a right second locking hole 203. The right locking mechanism 23 includes a right handle 231 and a right locking pin 232, the right handle 231 is configured to be hingedly connected to the right R rod 211 and swung up and down with respect to the right R rod 211, the right locking pin 232 is disposed on the right handle 231 to move with the right handle 231, and the right locking pin 232 is configured to be fitted with the right first locking hole 202 and the right second locking hole 203 for insertion.

In some embodiments of the present disclosure, the seat 30 includes a horizontal support frame 31 and a seat plate 32. The horizontal support frame 31 has a left and right retractable structure, and left and right ends of the horizontal support frame 31 are configured to be mounted to the left armrest component 10 and the right armrest component 20 for connection respectively. The seat plate 32 is disposed on the horizontal support frame 31. In some embodiments of the present disclosure, left and right ends of the horizontal support frame 31 are configured to be detachably mounted on the left lower reinforcing rod 113 and the right lower reinforcing rod 213 respectively, allowing the seat 30 to be removed as needed. Moreover, the horizontal support frame 31 is configured to be moved adjustable back and forth along the left lower reinforcing rod 113 and the right lower reinforcing rod 213, and back and forth positions can be adjusted as needed. Further, both ends of the horizontal support frame 31 are disposed on a first fastener end cap 311 and a second fastener end cap 312 respectively, the first fastener end cap 311 and the second fastener end cap 312 are mounted on the left lower reinforcing rod 113 and the right lower reinforcing rod 213 respectively, making easily to disassembly and assembly. In addition, specifically, horizontal support frame 31 includes two left support tubes 313 and two right support tubes 314. The two left support tubes 313 are configured to be arranged at parallel intervals front to back, the two right support tubes 314 are configured to be arranged at parallel intervals front to back and sleeved with the two left support tubes 313 respectively. The two right support tubes 314 are configured to be moved from left to right with respect to the two left support tubes 313, and locking members 315 are provided between the two right support tubes 314 and the two left support tubes 315, for locking after expansion adjustment. Further, bottom of the seat plate 32 is configured to be connected to the horizontal support frame 31 via a plurality of U-shaped connectors 33, which has a simple structure and easy to assembly. And, a plurality of air vents 321 are formed throughout upper and lower surfaces of the seat plate 32, which can improve breathability for more comfortable use.

In some embodiments of the present disclosure, the two front support members 40 have upper and lower retractable structures, and the two front support members 40 are configured to be mounted to a front bottom of the left armrest component 10 and a front bottom of the right armrest component 20 for connection respectively. Specifically, in some embodiments of the present disclosure, each of the two front support member 40 includes a front upper support tube 41 and a front lower support tube 42. An upper end of the front upper support tube 41 is configured to be fixedly connected to the front bottom of the left R rod 111 or the front bottom of the right R rod 211, and a lower end of the front upper support tube 41 is configured with a second resilient lug 401. The front lower support tube 41 is configured to be sleeved at outside of the front upper support tube 41 and retractable disposed with respect to the front upper support tube 41, and the front upper support tube 42 is opened with a plurality of second holes 402 spaced apart up and down arrangement. And the second resilient lug 401 is configured to be fitted with corresponding second hole 402 for positioning, which makes the structure is simple and easy to adjust expansion. In addition, a lower end of the front lower support tube 42 is configured with a caster 43, to facilitate movement.

In some embodiments of the present disclosure, the two rear support members 50 have the upper and lower retractable structures, and the two rear support members 50 are configured to be mounted to a rear bottom of the left armrest component 10 and a rear bottom of the right armrest component 20 for connection respectively. Specifically, in some embodiments of the present disclosure, each of the two rear support members 50 includes a rear upper support tube 51 and a rear lower support tub 52. An upper end of the rear upper support tube 51 is configured to be fixedly connected to the rear bottom of the left R rod 111 or the rear bottom of the right R rod 211, and a lower end of the rear upper support tube 51 is configured with a third resilient lug 501. The rear lower support tube 52 is configured to be sleeved at outside of the rear upper support tube 51 and retractable disposed with respect to the rear upper support tube 51, and the rear lower support tube 52 is opened with a plurality of third holes 502 spaced apart up and down arrangement, and the third resilient lug 501 is configured to be fitted with corresponding third hole 502 for positioning, which makes the structure is simple and easy to adjust expansion. In addition, a lower end of the rear lower support tube 52 is configured with an anti-slip floor pad 53.

Operations of the retractable walker of the present disclosure described in detail as follows.

When in use, according to a height of a user, lengths of the two front support members 40 and the two rear support members 50 are adjusted; and further according to fat or thin of the user, a left to right width between the left armrest component 10 and the right armrest component 20 is adjusted, and a left and right length of the horizontal support frame 31 is also adjusted. Then the seat 30 is mounted on the left armrest component 10 and the right armrest component 20. At this time, the user may hold the left armrest component 10 and the right armrest component 20 for walking, or sit on the seat 30 to rest. The retractable walker of the present disclosure (hereinafter referred to as the product) can also assist people in a bathroom get up, the product is very convenient for the elderly, the mobility, the rehabilitation personnel, whether obese people or thin people, to walk wide rode, narrow road, narrow room door. When need to be folded, the seat 30 is removed, then the left handle 131 is pulled upward, so that the left side frame 11 and the left front frame 12 can be folded into each other. Similarly, the right handle 231 is pulled upward, so that the right side frame 21 and the right front frame 12 can be folded into each other. In this way, it is easily to storage.

Designs of the retractable walker of the present disclosure focuses on that, by providing the left armrest component and the right armrest component at left and right and making them connected to each other with the left and right retractable adjustment, the horizontal support frame adopts the left and right retractable structure, and cooperation with the two front support members and the two rear support members having the upper and lower retractable structures, the product can be retracted to adjust sizes, thereby applicable to different tall and short, fat and thin populations, which can greatly improve versatility of the product, more convenient to use.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A retractable walker, comprising a left armrest component, a right armrest component, a seat, two front support members, and two rear support members;

wherein the left armrest component and the right armrest component are configured to be disposed at left and right and connected to each other in a left and right retractable adjustment;

wherein the seat comprises a horizontal support frame and a seat plate, the horizontal support frame has a left and right retractable structure, and left and right ends of the horizontal support frame are configured to be mounted to the left armrest component and the right armrest component for connection respectively, and the seat plate is disposed on the horizontal support frame;

wherein the two front support members have upper and lower retractable structures, and the two front support members are configured to be mounted to a front bottom of the left armrest component and a front bottom of the right armrest component for connection respectively; and wherein the two rear support members also have the upper and lower retractable structures, and the two rear support members are configured to be mounted to a rear bottom of the left armrest component and a rear bottom of the right armrest component for connection respectively.

2. The retractable walker according to claim 1, wherein the left armrest component comprises a left side frame and a left front frame, and the left front frame is configured to be connected to a front side of the left side frame; and wherein the right armrest component comprises a right side frame and a right front frame, the right front frame is configured to be connected to a front side of the right side frame, and the right front frame and the left front frame are configured to be sleeved to each other in a left and right retractable connection.

3. The retractable walker according to claim 2, wherein the left side frame comprises a left R rod, a left upper reinforcing rod and a left lower reinforcing rod; both ends of the left upper reinforcing rod are configured to be fixedly connected to front and rear sides of an upper end of the left R rod respectively, and both ends of the left lower reinforcing rod are configured to be fixedly connected to front and rear sides of a lower end of the left R rod respectively; and wherein the right side frame comprises a right R rod, a right upper reinforcing rod and a right lower reinforcing rod; both ends of the right upper reinforcing rod are configured to be fixedly connected to front and rear sides of an upper end of the right R rod respectively, and both ends of the right reinforcing rod are configured to be fixedly connected to front and rear sides of a lower end of the right R rod respectively.

4. The retractable walker according to claim 3, wherein the left R rod is sleeved with a left upper armrest cover and the right R rod is sleeved with a right upper armrest cover accordingly.

5. The retractable walker according to claim 3, wherein the right R rod is sleeved with a left lower armrest cover and the right R rod is sleeved with a right lower armrest cover accordingly.

6. The retractable walker according to claim 3, wherein the left front frame comprises a left casing, a left upper rod and a left lower rod; the left casing is configured to be sleeved on a front side of the left R rod, the left upper rod and the left lower rod are configured to be disposed in parallel above and below and fixedly connected to the left casing; and wherein the right front frame comprises a right casing, a right upper rod and a right lower rod; the right casing is configured to be sleeved on a front side of the right R rod, the right upper rod and the right lower rod are configured to be disposed in parallel above and below and fixedly connected to the right casing; and the right upper rod and the right lower rod are configured to be sleeved with the left upper rod and the left lower rod for connection respectively.

7. The retractable walker according to claim 6, wherein the left upper rod is configured to be sleeved at outside of the right upper rod, the left lower rod is configured to be sleeved at outside of the right lower rod, the left upper rod is opened with a plurality of first holes spaced in a left and right arrangement, a tail end of the right upper rod is configured with a first resilient lug, and the first resilient lug is configured to be snapped with corresponding first hole for positioning.

8. The retractable walker according to claim 7, wherein a tail end of the left upper rod is sleeved with a collar and the collar is configured with a locking screw.

9. The retractable walker according to claim 6, wherein the left R rod is configured to be turned left and right with respect to the left casing, and a left locking mechanism is provided between the left R rod and the left front frame; and wherein the right R rod is configured to be turned left and right with respect to the right casing, and a right locking mechanism is provided between the right R rod and the right front frame.

10. The retractable walker according to claim 9, wherein the left front frame is opened with a left first locking hole and the left R rod is opened with a left second locking hole, the left locking mechanism comprises a left handle and a left locking pin, the left handle is configured to be hingedly connected to the left R rod and swung up and down with respect to the left R rod, the left locking pin is disposed on the left handle to move with the left handle, and the left locking pin is configured to be fitted with the left first locking hole and the left second locking hole for insertion; and wherein the right front frame is opened with a right first locking hole and the right R rod is opened with a right second locking hole, the right locking mechanism comprises a right handle and a right locking pin, the right handle is configured to be hingedly connected to the right R rod and swung up and down with respect to the right R rod, the right locking pin is disposed on the right handle to move with the right handle, and the right locking pin is configured to be fitted with the right first locking hole and the right second locking hole for insertion.

11. The retractable walker according to claim 9, wherein left and right ends of the horizontal support frame are configured to be detachably mounted on the left lower reinforcing rod and right lower reinforcing rod respectively.

12. The retractable walker according to claim 11, wherein the horizontal support frame is configured to be moved adjustable back and forth along the left lower reinforcing rod and the right lower reinforcing rod.

13. The retractable walker according to claim 12, wherein both ends of the horizontal support frame are disposed on a first fastener end cap and a second fastener end cap respectively, the first fastener end cap and the second fastener end cap are mounted on the left lower reinforcing rod and the right lower reinforcing rod respectively.

14. The retractable walker according to claim 11, wherein the horizontal support frame comprises two left support tubes and two right support tubes, the two left support tubes are configured to be arranged at parallel intervals front to back, the two right support tubes are configured to be arranged at parallel intervals front to back and sleeved with the two left support tubes respectively, the two right support tubes are configured to be moved from left to right with respect to the two left support tubes, and locking members are provided between the two right support tubes and the two left support tubes.

15. The retractable walker according to claim 1, wherein bottom of the seat plate is configured to be connected to the horizontal support frame via a plurality of U-shaped connectors.

16. The retractable walker according to claim 1, wherein a plurality of air vents are formed throughout upper and lower surfaces of the seat plate.

17. The retractable walker according to claim 2, wherein each of the two front support members comprises a front upper support tube and a front lower support tube;

wherein an upper end of the front upper support tube is configured to be fixedly connected to the front bottom of the left R rod or the front bottom of the right R rod, and a lower end of the front upper support tube is configured with a second resilient lug;

wherein the front lower support tube is configured to be sleeved at outside of the front upper support tube and retractable disposed with respect to the front upper support tube, and the front upper support tube is opened with a plurality of second holes spaced apart up and down arrangement; and wherein the second resilient lug is configured to be fitted with corresponding second hole for positioning.

18. The retractable walker according to claim 17, wherein a lower end of the front lower support tube is configured with a caster.

19. The retractable walker according to claim 2, wherein each of the two rear support members comprises a rear upper support tube and a rear lower support tube;

wherein an upper end of the rear upper support tube is configured to be fixedly connected to the rear bottom of the left R rod or the rear bottom of the right R rod, and a lower end of the rear upper support tube is configured with a third resilient lug;

wherein the rear lower support tube is configured to be sleeved at outside of the rear upper support tube and retractable disposed with respect to the rear upper support tube, and the rear lower support tube is opened with a plurality of third holes spaced apart up and down arrangement; and wherein the third resilient lug is configured to be fitted with corresponding third hole for positioning.

20. The retractable walker according to claim 19, wherein a lower end of the rear lower support tube is configured with an anti-slip floor pad.

* * * * *